Nov. 7, 1933.     W. E. CRAWFORD     1,933,967
METHOD AND APPARATUS FOR ELECTRIC WELDING
Filed May 8, 1929       3 Sheets-Sheet 1
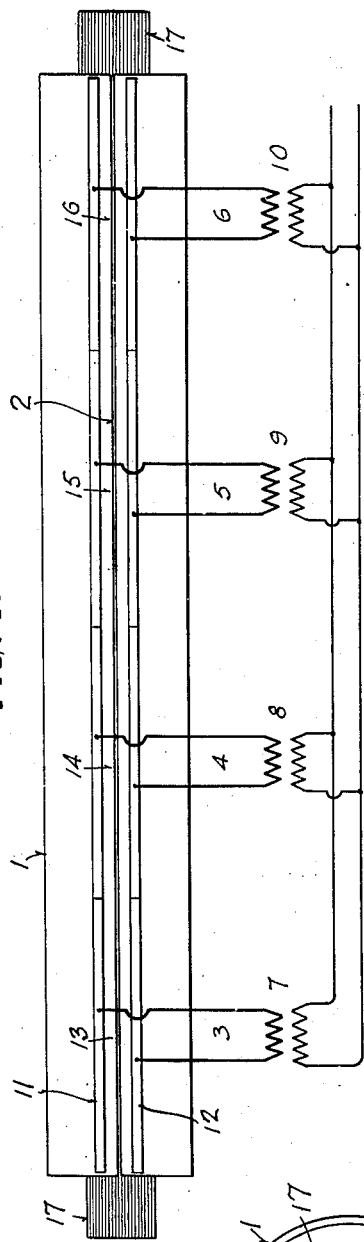
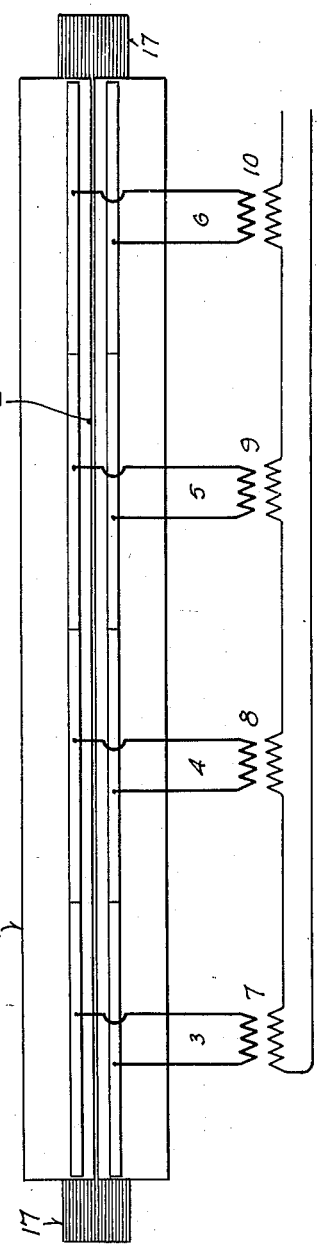
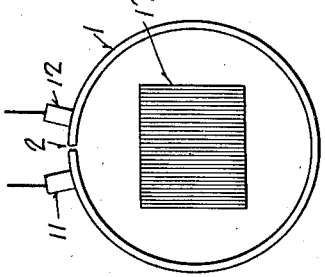
INVENTOR.
William E. Crawford
BY
ATTORNEY.

Nov. 7, 1933.   W. E. CRAWFORD   1,933,967
METHOD AND APPARATUS FOR ELECTRIC WELDING
Filed May 8, 1929   3 Sheets-Sheet 2

INVENTOR.
William E. Crawford
BY
ATTORNEY.

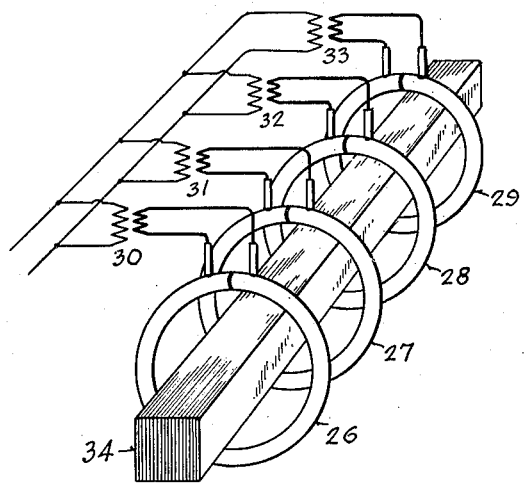
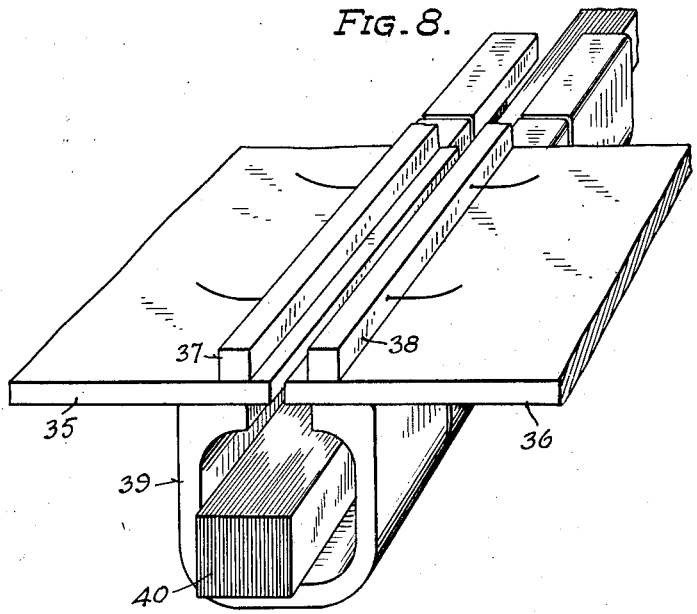

Patented Nov. 7, 1933

1,933,967

UNITED STATES PATENT OFFICE 1,933,967

METHOD AND APPARATUS FOR ELECTRIC WELDING

William E. Crawford, Wauwatosa, Wis., assignor to A. O. Smith Corporation, Milwaukee, Wis., a corporation of New York Application May 8, 1929. Serial No. 361,432

13 Claims. (Cl. 219—4)

This invention relates to a method and apparatus for electric welding and is particularly applicable to the welding of longitudinal seams of tubular articles as in the manufacture of electrically welded pipe wherein a flat sheet of metal is converted into a tubular blank having a single longitudinal seam which is welded simultaneously for the full length thereof by passing an alternating electric current across the edges and establishing an electric arc thereacross to heat the edges uniformly throughout the common length thereof and then applying pressure to the edges to weld the same together.

The invention is applicable to welding of the longitudinal seams in forming tubular articles or pipe sections where the seam may be several feet in length; and the invention is particularly useful in the welding of such longitudinal seams where the length amounts to the order of from 20 to 40 feet. The usefulness of the invention is not limited, however, to any particular length or lengths, and applies to any and all welding of a seam simultaneously for the full length thereof where it is found to be desirable or necessary to distribute the welding current to the work by a plurality of current supplying leads or by a single lead of a width coextensive with the length of the seam to be welded.

This invention also contemplates the simultaneous welding in a single machine of a plurality of rings arranged along a common axis and supported either with their ends substantially abutting or spaced apart, the operation being controlled in such manner that the seam in all of the rings is welded simultaneously and by current which may be supplied cooperatively along the entire length of the combined seam of all the rings to be welded.

During the advance of the edges toward each other to establish the flashing arc, irregularities in these edges may cause early points or areas of contact therebetween. The flashing arc tends to destroy these irregularities and to make the edges perfectly aligned throughout the length thereof so that the heating current passing thereacross will be uniform and the edges will be heated uniformly and simultaneously to welding temperature.

The entire heating of the edges need not be accomplished by the flashing arc but the welding operation may be a combination of flashing and resistance heating, the invention being particularly applicable wherever a flashing arc is employed during any part of the welding operation.

Due to slight irregularities in the edges which cause points of early contact therebetween, as above referred to, it has heretofore been difficult to maintain the flashing arc and to control the welding operation with the desired rate of advance of the edges toward each other, particularly where the seam to be welded is of a length of great enough magnitude to tend to cause separate parts thereof to function during the welding operation similar to several somewhat independent welding units.

A seam of some length may be considered as being composed of regions. The number of these regions may correspond to the number of transformers which furnish their respective areas with the electric current employed to heat the edges in their respective regions. Or, where a plurality of separate rings are being simultaneously welded in a single welding operation, the idea of regions or separate areas of the work will be clearly understood. With the distance between the centers of two of the regions considerably greater than the distance between a pair of electrodes in contact with the tube, the transfer of welding current through the work from one region to another becomes small, and is a minimum when considering spaced rings. This fact is true because of the resistance of the tube to the flow of electric current through the relatively greater distance from one region to the other. The definite limiting of any tendency for the current to flow longitudinally from one region to the other is due even in a much greater degree to the increase of the reactance, opposed to the flow of an alternating current in a circuit, when that circuit is lengthened. Since the latter of the two causes is the greater, the different regions tend to function as separate independent units even though they have in common a pair of leads and contacts coextensive throughout the distance covering these several regions.

As above set forth, the several parts of the seam to be welded may act quite independently of each other, where separate transformers are used to furnish the heating current to their respective regions; and the same independent action of the parts or regions of the seam may obtain where any type of elongated transformer is used to distribute secondary or welding current at points corresponding to the described regions of the seam to be welded.

In the welding operation, where utilizing the flashing arc it is especially advantageous to advance the edges toward each other as rapidly as possible to complete the operation and conserve the heat produced to cause proper heating of these edges. With the appropriate rate of advance of the edges, if the amount of heating current available at any point of early contact is not sufficient to remove the obstruction and maintain the arc, then the rate of feeding of the edges must be lessened. When the above holds true in a number of comparatively independent regions the difficulty of operating the combined welding unit becomes great. It will be apparent, therefore, that a method which provides cooperation between a number of the regions and their associated sources of energy whereby such sources of energies may be made available, by transfer, to any particular point along the seam, will make it easier to continually maintain the flashing arc and to also maintain the appropriate rate of advance of the edges to be heated.

It is known in the art of resistance welding, as, e. g. in Patent No. 403,159, issued to Thomson, that when alternating current heating of the edges of a ring is employed certain benefits are obtained by the use of a magnetic member encircling the ring. An alternating magnetic flux is set up in the magnetic member by the portion of current passing through the back of the ring. This flux induces a voltage opposed to the flow of this current in the back of the ring and tends to limit the amount of heat which is wastefully expended therethrough.

The present invention contemplates employing the back leakage of current to accomplish the purposes herein set forth.

The object of the present invention is to reduce the detrimental effect of uneven conditions of contact and changes in the working potential along the seam and to cause the welding apparatus to function as a unit.

Another object of the invention is to permit the employment of a lower applied voltage and still advance the edges toward each other during the flashing operation at a predetermined appropriate rate, thus lessening the danger of burning the work by the employment of too great a flashing voltage, and at the same time accomplishing an effective weld at a higher rate of speed than has heretofore been possible.

Another object is to increase the stability of the flashing arc.

The invention may be more readily understood by reference to the accompanying drawings in which the views are as follows:

Figure 1 is a diagrammatic plan view of the apparatus.

Figure 2 is a similar end view thereof.

Figure 3 is a diagrammatic plan view of a modification of the arrangement of the transformers to supply the heating current.

Figure 7 is a perspective view showing a modified application of the invention to the welding of separate rings.

Figure 8 is a perspective view showing another modified application of the invention.

Figure 4:
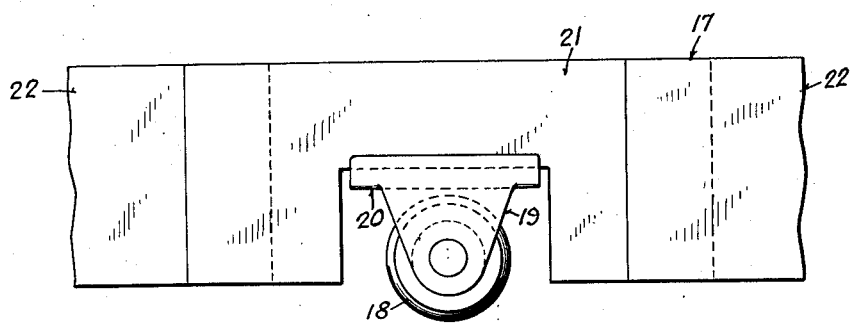
Figure 4 is a side elevation of a reduced portion of the core employed in said pipe.

The tube or pipe 1 may be formed from a flat sheet of metal which is converted into a tubular blank having a single longitudinal seam 2 to be welded.

Due to the length of the seam and the desirability of finally providing uniform welding currents for the different portions therealong, it is preferable to employ a plurality of pairs of leads 3, 4, 5, and 6 arranged to distribute the welding current along the seam. These leads may form the separate secondaries of a plurality of transformers 7, 8, 9, and 10 arranged in parallel, although a single long transformer having a single band-like secondary extending for substantially the full length of the seam and forming a single pair of leads, or any suitable means for supplying and distributing the current to the seam, may be employed. The transformers may have a common core or may operate independently of each other.

Figure 3 shows one of the several possible modifications of the method of supplying current along the edges to be heated. Here the primaries of the several transformers are connected in series circuit. Other combinations and modifications will readily suggest themselves to an electrician or one skilled in the art.

The pairs of leads (Figure 1) are connected to electrodes 11 and 12 arranged along opposite sides of the seam to be welded. These electrodes may be continuous for the full length of the seam, or they may be made in sections which may correspond to the number of pairs of leads employed.

In order to more clearly illustrate the invention, the seam 2 of Figure 1 is divided into four portions, 13, 14, 15 and 16, corresponding to the regions to which the welding current is distributed by the separate pairs of leads. The seam is preferably welded by establishing an electric arc known as a flashing arc across the edges thereof to heat the same simultaneously for the full common length thereof and then pressing the heated edges together to weld the same. However, the flashing arc need not be employed for the entire heating operation. The energizing potential may be applied to the combined unit prior to the contacting of the edges or after the edges are in substantial contact.

The potential normally applied across the terminals or electrodes 11 and 12 in order to maintain the passage of current across the edges to be welded is referred to herein as the working potential or working voltage.

In order to obtain desirable welding conditions and to properly control the flashing arc, it is desirable to have as uniform working voltage conditions throughout the length of the seam as possible with a minimum of changes in the working voltage.

An early contact of the edges at any one region, such as region 14, will tend to establish an excessive flow of current and materially lower the working voltage in that region. Such wide variations in the working voltage which tend to constantly reoccur along the seam to be welded make it extremely difficult to control the welding apparatus as a unit and to feed the edges towards each other during the welding operation in a manner which will early produce a uniform heating current thereacross.

Furthermore, it has been found that the proportion of back leakage of current around the tube is greater at the ends of the tube than in the center thereof, thus tending to make more unfavorable heating conditions at the ends of the tube.

The present invention overcomes these difficulties by placing within the tube or within the several rings to be welded a magnetic flux carrier which causes a co-relation between the currents in the different regions along the seam, effective to maintain a more uniform working voltage so that the welding apparatus may be controlled as a unit. This magnetic flux carrier preferably comprises a core 17 of laminated iron extending for the full length of the pipe, although the core may have additional functions such as that of an inside mandrel or a container for the metallic spatter produced by the flashing arc.

The size of the core preferably depends upon the size of the pipe, the working potential employed, and also the use to be made of the core for other purposes as above suggested. In the welding of large pipe there may be less back leakage of current than with small pipe, thus requiring a different amount of core to properly oppose the back leakage; but the amount of core preferably employed for the purposes of this invention is independent of the amount required to oppose a given voltage tending to produce back leakage of current since by the present invention the back leakage of current is employed to produce the cooperation of the welding current in the various regions.

A very conspicuous advantage that is realized by the practice of this invention is that the use of the core or flux carrying member makes it possible to weld with good results and at a rapid rate, while using a lower impressed voltage than is otherwise required. This is due to the fact that such changes in current value in one or more of the regions or areas of the work, as is incident to the operation, only make a slight change in the total flux threading the core member, and it is principally this factor, as will be explained, which tends to prevent points or areas of reduced voltage along the length of the seam during the actual welding operation. With the employment of reduced voltage, the risk of burning the work, which must be carefully guarded against when using higher impressed voltages, is entirely avoided.

Figure 5:
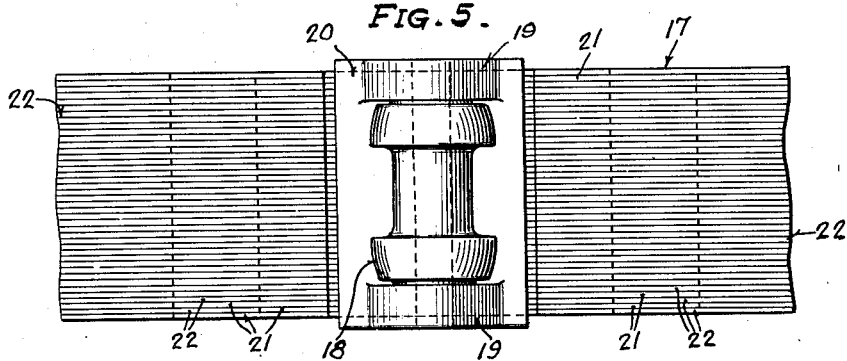
Figure 5 is a bottom view of the portion shown in Figure 4.

In order to prevent the excessive back leakage of current at the ends, as compared with the leakage at the center of the tube, it is preferable to have the core extend beyond the ends of the tube. This extension of the core aids in maintaining a substantially uniform strength of the magnetic flux within the tube and tends to prevent leakage of the flux near the ends of the core to and through the sides of the tube. In the welding of tube sections of thirty to forty feet in length, it has been found advisable in certain sizes of tube to extend the core about eighteen inches beyond each end of the tube although any extension of the core is of material advantage and the desired extensions may be readily determined by simple trials.

Where the core is long, due to the length of the article being welded, it is sometimes preferable to employ rollers or other supporting means for the core within the article and, where the tube is so small that these rollers must cut into the cross-section of the core, it is preferable to construct the reduced region of the core as shown in Figures 4 and 5 in order to maintain a substantially uniform efficiency throughout the length of the core.

The roller 18 is arranged underneath the core and journalled in arms 19 on a solid metal block 20 which is fastened to the laminations of the core. The core laminations may be made in sections so that laminations 21 extend through the reduced portion and join alternately with the laminations 22 of the main body of the core as shown in Figure 5. This type of joint provides a maximum area enabling the passage of a maximum amount of magnetic flux therethrough with the minimum reluctance, to its passage. However, the laminations of the core may extend for the full length of the core. By cutting out only a portion of each lamination, as shown, the magnetic flux has a substantially continuous path. The block 20 is preferably spaced from the ends of the laminations of the core, as shown in Figure 4, in order to prevent too high a flux concentration in the block which might tend to overheat the same.

Figure 6:
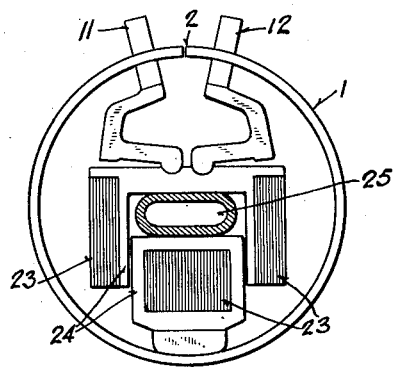
Figure 6 is an end elevation of the modified form of core.

In Figure 6 the core 23 is shown as built into an arbor 24 which aids in clamping the pipe during the welding operation. A flexible hose 25 is used to expand the arbor and hold it firmly in position within the tube.

Where, as above set forth, an excessive power load is developed in the region 14, the core tends to prevent a reduction in working potential, to maintain more uniform load conditions among the leads feeding the contacting edges by increasing the load on the adjacent regions 13 and 15 and tending to relieve the leads 4 which conduct welding current to the region 14 from excessive load.

This may be explained as follows: Assuming that there are uniform load conditions across the seam to be welded, there will be ordinarily a uniform back leakage of current which will set up a given amount of flux in the core throughout all of the regions 13, 14, 15 and 16. This flux tends to set up a counter electromotive force opposing the back leakage of current throughout the length of the seam. When an excessive current is developed across the seam in region 14, as above set forth, the reduction in working potential results in a lessening of the back leakage current in that particular region, thus tending to somewhat reduce the flux in the core in that region. However, some of the flux which is present in the core through the regions 13 and 15 is made available to strengthen the flux of the core in the region 14 and thus secure a greater flux through the region 14 than would otherwise be maintained if the core did not extend into the regions 13 and 15.

This strengthening or sustaining of flux in the core tends to set up a greater counter electromotive force in the pipe in region 14 than would ordinarily be set up if the core did not extend into the regions 13 and 15, and thus maintain the counter electro-motive force in the region 14 to additionally reduce the back leakage current and make such opposed current available for use across the edges in heating. The counter electromotive force may be sufficiently strong to actually cause a reversal of current flowing around the back of the tube in the region 14, which reversed current crosses the edges in the direction of the main heating current thereby directly aiding in the welding operation. In either case the amount of current available for heating the edges in the region 14 is increased by the cooperation of transformers 7 and 9 and also to some extent by transformer 10 through the medium of the core 17 inserted in the tube.

The additional heating current supplied to the edges in the region 14 quickly heats the contacting projections thereof and flashes the same away thus tending to establish a flashing arc and bringing the voltage conditions in the region 14 back to normal relative to the voltage conditions in the regions 13, 15 and 16.

The alignment of the edges by means of flashing off such projections is made more rapid so that a uniform heating current may be established across the edges earlier in the welding operation. The cooperating action of the core tends to stabilize the welding operation and to create a uniform flashing arc throughout the length of the seam.

The changes in working voltage which would ordinarily be apparent in local regions of the seam are reduced and the few changes which may occur are much more general and gradual in extent, thus making the application of the welding potential more uniform throughout the entire length of the seam. The currents supplied by the several transformers or applied to the several leads are more nearly equal to each other. The apparatus functions as a unit and can be readily controlled in operation for simultaneously welding seams as long as thirty or forty feet.

The foregoing explanation of transformer action in the work, will be readily appreciated in its application to simultaneous welding of a plurality of axially aligned rings, where adjacent rings may constitute the primary and secondary of such transformer.

Thus in Figure 7 the invention is employed in the simultaneous welding of a plurality of axially aligned rings 26, 27, 28 and 29. The rings are supplied with welding current from separate transformers 30, 31, 32 and 33, and have a common core 34 extending axially through them.

Where the edges of ring 27 contact earlier than the edges of rings 26 and 28 there is an excessive load created at the edges of ring 27. When this occurs, and the power load across the edges of ring 27 becomes materially greater than that across the edges of ring 28, transformer action is set up between the two rings, in a way which constitutes the ring 28 as a primary and the ring 27 as a secondary. For the purposes of this explanation, we may consider that in the functioning of this special transformer, the primary ring 28 is furnished by power from its leads or transformer 32 and this power is delivered by the transformer action of the core 34 to the edges of the ring 27 in addition to the power which would normally be delivered to ring 27 by its own leads or power transformer 31. Thus an increase of load at the edges of ring 27 will draw additional power from the neighboring rings and relieve the transformer 31 from excessive load, and thereby make the welding of the rings uniform and enable a unitary control of the welding operations.

This unitary control of the welding operations obtains in a common and simultaneous feeding of the edges of the respective rings to weld the same simultaneously in one operation.

In Figure 8 the invention is shown applied to the flash welding of flat sheets together. The sheets 35 and 36 are arranged in position and clamped between the electrodes 37 and 38 and a member 39, the clamping members extending along the sheets adjacent the edges to be welded. The clamping member 39 is preferably tubular and of copper to form a path for leakage of current similar to the back of the pipe of Figure 1. A core 40 is arranged within this tubular clamping member and extends therewith for the full length of the seam being welded. The leakage of current through the member 39 sets up magnetic flux in the core 40 and provides a transformer action in the manner explained above in the welding of tubular members. In this way a more uniform working potential is maintained across the edges for the full length thereof.

In a manner similar to the above explained application of the invention to flash welding flat sheets, it is contemplated that auxiliary current conducting bands corresponding to the clamping member 39 may be employed inside or outside of the pipe in Figure 1 to aid in obtaining the transformer action between the different regions thereof.

I claim:

1. The method of welding a longitudinal seam to close a cleft in a tubular article which comprises applying an alternating current voltage across the cleft at a plurality of spaced points to deliver welding currents, moving the edges of the tubular article defining the cleft toward one another to establish welding arcs, concentrating the magnetic flux by means of a core in the tubular article to effect a distribution of the welding power delivered at the voltage application points, and forcing the edges of the article defining the cleft into engagement when they have been brought to a welding condition to complete the welding operation.

2. The method of welding a longitudinal seam to close a cleft in a tubular article which comprises applying an alternating current voltage across the cleft in a plurality of different sections, moving the edges of the article defining the cleft toward one another to establish welding flashing arcs to effect a heating of the metal adjacent the cleft, compensating for variations in power consumption in the different sections in the tubular article through a core which inductively connects the different sections to effect a distribution of power, and forcing the edges of the tubular article into engagement when they have been brought to a welding condition to complete the welding operation.

3. The method of welding a longitudinal seam to close a cleft in a tubular article which comprises applying an alternating current voltage across the cleft in different sections of the tubular article, moving the edges of the tubular article toward one another to cause welding current to flow across the cleft, distributing power from one section of the tubular article to another by means of a core which inductively connects the different sections, and forcing the edges of the tubular article into engagement when they have been brought to a welding condition.

4. The method of welding a seam to close a cleft between a plurality of plates which comprises applying an alternating current voltage across the cleft at a plurality of spaced points to deliver welding currents, moving the edges of the plates defining the cleft toward one another to establish welding arcs, concentrating the lines of magnetic flux generated by the current flowing in the welding arcs to provide a loop bridging the cleft, distributing the welding power delivered at the voltage application points along the cleft by means of a core associated with the magnetic loop, and forcing the edges of the plates into engagement when they have been brought to a welding condition to complete the welding operation.

5. Apparatus for controlling welding currents drawn from a source of power to weld a cleft in an article which has a metallic loop bridging the cleft comprising, electrodes for delivering current to the article along the cleft, means for delivering current from the source of power to a plurality of points along the electrodes causing currents to flow in the metallic loop and develop a plurality of substantially independent magnetic fields, and a magnetizable core disposed in inductive relation to the metallic loop to concentrate the lines of flux of the magnetic fields to interconnect them and induce a current which flows across the welding cleft in any zone where the current is increased over the current drawn from the electrodes in any other zone to increase the heating in that zone.

6. Apparatus for controlling welding currents drawn from a source of power to perform welding operations in an article which forms a metallic loop bridging the cleft to be welded comprising, a plurality of transformers connected to the source of power in parallel circuit relation, pairs of electrodes connected to the transformers for delivering welding currents to the article, and a core disposed in relation to the article to induce a current cumulative with the welding current delivered by any pair of electrodes when the current drawn from that pair of electrodes is increased above that delivered by the other pairs as a result of welding conditions.

7. Apparatus for controlling welding currents drawn from a source of power to weld a cleft in an article which has a metallic loop bridging the cleft comprising, a plurality of transformers connected in parallel circuit relation to the source of power for delivering welding currents, a plurality of pairs of electrodes for delivering welding current to the article, the currents delivered by each pair of electrodes to the metallic loops developing substantially separate magnetic fields, and a magnetizable core disposed in the metallic loop to concentrate the lines of flux of the different magnetic fields to induce a current cumulative with the welding current delivered by a pair of electrodes when the current drawn from that pair of electrodes is greater than the currents delivered by the other pairs, thereby to increase the heating in a zone of the welding cleft.

8. Apparatus for controlling welding currents drawn from a source of power to weld a cleft in an article which has a metallic loop bridging the cleft comprising, electrodes disposed in electrical contact with the article throughout the length of the welding cleft, means for impressing a voltage on opposed sections of the electrodes to cause currents to flow across the cleft and in the metallic loop, and a magnetizable core disposed in inductive relation to the metallic loop to cooperate in the distribution of power drawn from the source of power.

9. In apparatus for welding, by electric currents drawn from a source of alternating electric energy, a long seam concurrently in a cleft article having leakage current paths, in combination, a plurality of transformers connected to the source of energy, a pair of leads from each transformer connected to opposite sides of the cleft to be welded at longitudinally spaced positions to impress voltage across the cleft and to provide welding currents thereacross and leakage currents around the article through the leakage paths, a continuous magnetic core extending parallel with the seam and encircled by the paths of the leakage currents from all of the transformers whereby magnetic flux from all of the leakage currents is caused to flow longitudinally of the core and to set up substantially equal counter-electromotive forces within all of the leakage paths irrespective of the leakage current in any particular path tending to assist the welding current at any particular position along the length of the seam being welded to burn away projecting portions of the meeting edges to equalize them, and means for forcing the heated edges together simultaneously throughout their length to weld them.

10. A welding machine for welding a longitudinal seam in a long tubular article simultaneously from end to end, comprising means disposed to support a cleft article to be welded, a source of alternating electric energy, means connecting the energy source to the article at the sides of the cleft to be welded at a plurality of spaced positions throughout the length thereof to impress voltage thereacross resulting in welding currents across the cleft and leakage currents around the article, a magnetic member disposed through the tubular article from end to end carrying magnetic flux induced by all of the leakage currents in the article and functioning as a transformer core for transferring energy to any one position which may require excessive current from the other positions, whereby the welding current at each position is controlled in accordance with the contour of the meeting edges to burn away the edges of the cleft to complementary contours, and means for forcing the edges of the cleft together to weld them.

11. A welding machine for welding a longitudinal seam simultaneously from end to end in a long tubular article having a cleft, comprising means disposed to support the article to be welded, a source of alternating electric energy, means connecting the energy source to the article at the sides of the cleft to be welded at a plurality of spaced positions throughout the length thereof to impress voltage thereacross resulting in welding currents across the cleft and leakage currents around the article, a magnetic member disposed through the tubular article from end to end for carrying the magnetic flux of all of the leakage currents in the article, whereby the welding current at each position is modified by the counter-electromotive force induced by the magnetic member in accordance with the leakage currents at all positions throughout the article to effect rapid burning away of the edges of the cleft at contacting points, thereby making the opposing edges complementary, and means for forcing the heated edges of the cleft together to weld them.

12. In an apparatus for electrically flash welding a longitudinal seam in a cleft tubular article presenting a current path in shunt circuit relation to the cleft to be welded by alternating electric currents drawn from a source of power comprising a plurality of transformers connected to the source of energy and to supply welding voltage across the cleft simultaneously at a plurality of spaced zones along the cleft, and a magnetic flux carrying member disposed to be energized by currents traversing the path in shunt to the cleft being welded for setting up substantially equal counter-electromotive forces in the shunt path to coordinate the simultaneous working voltages across the seam throughout the length thereof.

13. In an apparatus for simultaneously electrically flash welding a seam of substantial length by alternating electric currents drawn from a source of energy in a cleft article having leakage current paths in shunt circuit relation to the cleft to be welded, in combination, a plurality of transformers connected to the source of energy and to distribute current simultaneously at spaced points throughout the length of the cleft to be welded, and a magnetizable core disposed to be energized by leakage currents in the shunt path for inducing substantially uniform counter-electromotive forces to impress substantially uniform working voltages across the cleft being welded throughout the full length thereof.

WILLIAM E. CRAWFORD.